April 7, 1959     P. J. MARTUSCELLO ET AL     2,880,551

SHEET GLASS MANUFACTURE

Filed Nov. 7, 1955

INVENTORS
PETER J. MARTUSCELLO
AND MAYNARD G. STERMER

BY Clarence R. Patty, Jr.
ATTORNEY

United States Patent Office 2,880,551
Patented Apr. 7, 1959

2,880,551

SHEET GLASS MANUFACTURE

Peter J. Martuscello and Maynard G. Stermer, Corning, N.Y., assignors to Corning Glass Works, Corning, N.Y., a corporation of New York Application November 7, 1955, Serial No. 545,392

1 Claim. (Cl. 49—17)

The present invention relates to the production of sheet glass and is particularly concerned with the provision of an improved method of and apparatus suitable for the production of extremely thin sheet glass of uniform thickness.

In recent years thin glass sheet or ribbon has found extensive use as a substitute for mica in fixed capacitors. The ever present problem, however, has been to produce flaw free extremely thin ribbon of uniform thickness throughout its width as required for such use. Considerable success in this direction was attained with the perfection of glass drawing dies of the type disclosed in Brown Patent No. 2,422,466. However, such form of die is rather fragile, frequently becomes distorted in use and therefore is difficult to maintain in proper working condition. Moreover, consistent production of ribbon thinner than .001" with such form of die has been found to be extremely difficult.

According to the present invention a simpler and more rigid form of feeder die comprises a plain sheet of refractory material, such as platinum or the like, having a quadrate passage therethrough and whose passage borders are joined to the base of a hollow wedge also formed from platinum sheet material or the like. The die passage comprises a slot passing transversely through the rectangular faces of the wedge. Also, according to the invention such a feeder die is employed as the bottom of a forehearth or other form of molten glass supply container, with the wedge portion of the die projected upwardly into the supply body of molten galss.

By means of the foregoing arrangement a ribbon of glass is issued through the die slot in such a direction that there is less tendency for distortion of the die during use than is the case when the die is used in a fashion to hold a volume of molten glass, as in the method disclosed by the Brown patent. Moreover, the fact that the die is of a shape to inherently give it strength and that the slot is transverse to the planes of its rectangular faces adds further to its resistance to distortion. The fact that the die is used in such a fashion that the glass ribbon issuing from its slots enters the die cavity whose temperature is conditioned in accordance with the temperature of the molten glass surrounding the die, is believed to materially contribute to the quality of ribbon produced. Also it will be observed that the die slot is in the form of an inverted V and thus enables the glass to freely issue from different levels of the supply body in a vertical stream of ribbon form. It is believed that this part of the arrangement also contributes substantially to the successful production of glass in the exacting dimensions required.

For a better understanding of the invention reference is made to the accompanying drawing in which.

Figure 1:
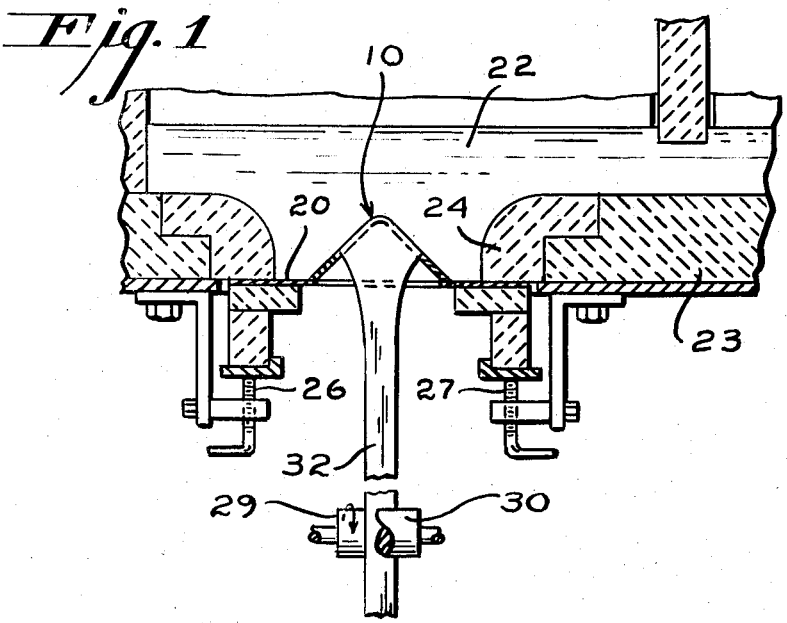
Fig. 1 is a vertical section through a forehearth containing a body of molten glass equipped with a feeder die embodying the invention.
Figure 2:
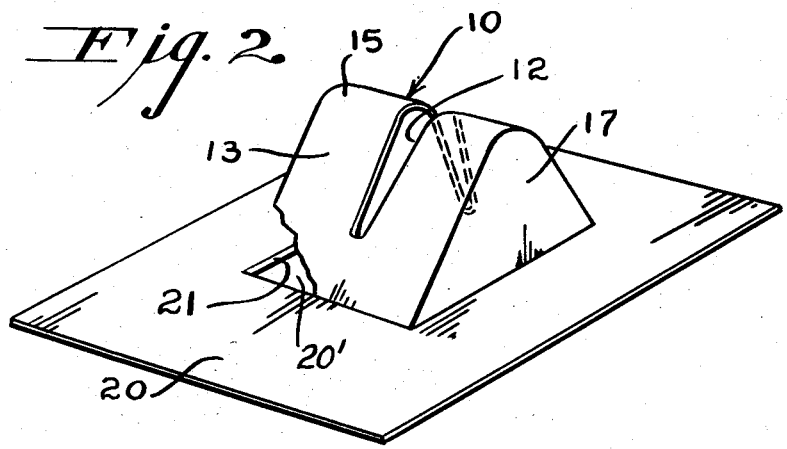
Fig. 2 is a greatly enlarged view, in perspective, of the feeder die.
Figure 3:
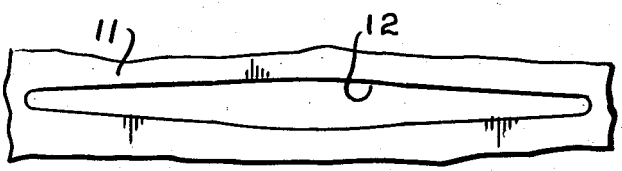
Fig. 3 is a projected view of a fragment of that portion of a sheet of material which is subsequently bent to form the rectangular faces of the die, and illustrates the slot width variation along its projected length.

In detail the feeder die illustrated comprises a hollow wedge shaped portion 10 formed from a sheet of material, such as 11, provided with a slot 12 and bent in a manner to form two rectangular faces, such as 13, meeting in an arcuate or rounded edge 15; the slot 12 thus passes transversely through such faces. The ends of the wedge shaped portion are closed by two generally triangular end faces, such as 17. The wedge shaped portion 10 has its base joined at 21 to a plain quadrate base 20 of sheet material along the border of a quadrate passage 20' therethrough.

In use the wedge shaped portion of the die is projected upwardly into a body of glass 22 within a container or forehearth, such as 23 and the sheet 20 clamped to the refractory 24 surrounding the bottom opening of the forehearth by suitable refractory and metal elements held in position by clamping screws 26 and 27. As will be observed, the die slot 12 is of maximum width in its central region and becomes progressively narrower as the end regions are approached.

With a die such as shown, whose wedge shaped portion is 9/16" in height, the dimension transverse the slot 3/4" and that parallel the slot 1 5/16", and with the slot of the approximate shape shown, excellent quality glass ribbon 32 approximately 3/4" wide and from .0003" to .0008" thickness can be drawn, the thickness, and the width to some extent, depending upon the rate of draw. Best results in drawing ribbons of the above size range have been obtained with a die having a projected slot length of 1 3/32" as in the sheet 11 and a slot width range of from 90 mils in the central region to 30 mils in the end regions. Suitable drawing rolls 29 and 30 are arranged a substantial distance below the die.

Obviously by suitably modifying the dimensions of the die larger size ranegs of ribbon may be drawn without departing from the spirit and scope of the invention.

What is claimed is:

In a ribbon glass drawing apparatus, a container for molten glass, a hollow wedge shaped die having triangular end faces and rectangular side faces projecting upwardly into said container so that the die is surrounded by molten glass therein, said die having a ribbon forming slot passing transversely through the said side faces.

References Cited in the file of this patent

UNITED STATES PATENTS

| 717,378 | Fourcault | Dec. 30, 1902 |
| 2,133,662 | Gray | Oct. 18, 1938 |
| 2,398,952 | Nachod | Apr. 23, 1946 |
| 2,422,466 | Brown | June 17, 1947 |
| 2,505,103 | Devol | Apr. 25, 1950 |
| 2,714,622 | McMullen | Aug. 2, 1955 |